(12) United States Patent  
Yang et al.

(10) Patent No.: US 8,855,015 B2  
(45) Date of Patent: Oct. 7, 2014

(54) TECHNIQUES FOR GENERIC PRUNING IN A TRILL NETWORK

(75) Inventors: Yibin Yang, San Jose, CA (US); Chia Tsai, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 132 days.

(21) Appl. No.: 13/586,208

(22) Filed: Aug. 15, 2012

(65) Prior Publication Data

US 2014/0050116 A1 Feb. 20, 2014

(51) Int. Cl.
H04L 12/28 (2006.01)

(52) U.S. Cl.
USPC .......................................... 370/254; 370/255

(58) Field of Classification Search
CPC ................................................. H04L 41/0806
USPC .................................................. 370/254, 255
See application file for complete search history.

(56) References Cited

U.S. PATENT DOCUMENTS

| 8,144,628 | B2 | 3/2012 | Previdi et al. |
| 2009/0067348 | A1 | 3/2009 | Vasseur et al. |
| 2010/0220730 | A1 | 9/2010 | Finn et al. |
| 2012/0201169 | A1* | 8/2012 | Subramanian et al. ........ 370/255 |
| 2013/0077627 | A1* | 3/2013 | Appalla et al. ................. 370/390 |
| 2013/0182581 | A1* | 7/2013 | Yeung et al. ................... 370/244 |
| 2014/0043972 | A1* | 2/2014 | Li et al. .......................... 370/230 |

* cited by examiner

*Primary Examiner* — Albert T Chou  
(74) *Attorney, Agent, or Firm* — Edell, Shapiro & Finnan, LLC (57) ABSTRACT

Techniques are provided for managing and distributing communications in a network. At a first switch device arranged in a first configuration in a network, a set of one or more network attributes are determined, which are associated with network communications that the first switch device is interested in receiving from other network devices. The first switch device sends to a controller device an attribute interest message that informs the controller device of the set of network attributes. The first switch device receives a mapping of the network attributes in to one or more identifiers. The identifiers are included in a header of subsequent frames sent in the network. An identifier interest message is then sent to a second switch device arranged in a second network configuration in the network to inform the second switch device of identifiers of the network attributes of which the first device has an interest.

27 Claims, 7 Drawing Sheets

| NETWORK ATTRIBUTE TYPE | NETWORK ATTRIBUTE VALUE | PRUNING ID | REVISION NO. |
|---|---|---|---|
| RESERVED | N/A | 0 (FOR UNPRUNING) | N/A |
| TRADITIONAL VLAN | 100 | 1 | 56 |
| IPv4 (*, G) | 224.10.20.30 | 1 | 56 |
| VIRTUAL NETWORK ID | 5000 | 2 | 78 |
| ... | ... | ... | ... |

FIG.4

TRILL FRAME WITH PRUNING ID

| SOURCE ADDRESS | DESTINATION ADDRESS | TRILL HEADER [PRUNING ID] | PACKET PAYLOAD | FRAME CHECK SEQUENCE |
|---|---|---|---|---|

TECHNIQUES FOR GENERIC PRUNING IN A TRILL NETWORK

TECHNICAL FIELD

The present disclosure relates to distributing communications in a network environment.

BACKGROUND

Devices in a network may be connected to one another across a plurality of network links. Network communications may traverse one or more of these network links as they travel between a source device in the network to a destination device in the network. Distribution trees may be assigned within the network to ensure optimal transmission of these network communications. Distribution trees may be rooted at one or more devices in the network, and new distribution trees may be calculated based on changes to the network topology.

DESCRIPTION OF EXAMPLE EMBODIMENTS

Overview

Techniques are provided for managing and distributing communications in a network. These techniques may be embodied as a method, apparatus and instructions in a computer-readable storage media to perform the method. At a first switch device arranged in a first configuration in a network, a set of one or more network attributes are determined. The network attributes are associated with network communications that the first switch device is interested in receiving from other devices in the network. The first switch device sends to a controller device in the network an attribute interest message that informs the controller device of the set of one or more network attributes. The first switch device receives from the controller device an identifier assignment message that maps the network attributes in the set of one or more network attributes to one or more identifiers. The one or more identifiers are configured to be included in a header of a subsequent frame sent in the network. An identifier interest message is then sent to a second switch device arranged in a second network configuration in the network. The identifier interest message is sent to inform the second switch device of identifiers of the one or more network attributes of which the first device has an interest.

Additionally, the controller device in the network receives the attribute interest message from the first switch device arranged in the first configuration. The attribute interest message informs the controller device of the set of network attributes associated with the network communications that the first switch device is interested in receiving from other devices in the network. One or more identifiers are mapped to the one or more network attributes in the set of network attributes to generate a map of the identifiers and the one or more network attributes associated with the identifiers. The one or more identifiers are configured to be included in a header of a frame sent in the network. The identifier assignment message is then sent to the first switch device. The identifier assignment message comprises the map.

Example Embodiments

The techniques described hereinafter involve managing communications in a network environment. An example network system/topology (hereinafter "network") is shown at reference numeral 100 in FIG. 1. The network 100 comprises a plurality of network devices which are shown at reference numerals 102(*a*)(1)-102(*a*)(4), 102(*b*)(1)-102(*b*)(4) and 104(1)-104(4). Each of the network devices in the network 100 is arranged in a particular configuration based on its connectivity to the other network devices. For example, in FIG. 1, the network devices 102(*a*)(1)-102(*a*)(4) are arranged in a first configuration in the network 100 as "leaf" devices, and network devices 102(*b*)(1)-102(*b*)(4) are arranged in a second configuration in the network as "spine" devices. In one example, leaf devices may be arranged in the network 100 such that every leaf device is directly connected to every spine device but not directly connected to other leaf devices. Likewise, spine devices may be arranged in the network 100 such that every spine device is directly connected to every leaf device but not directly connected to other spine devices. This arrangement, however, is only an example, and the leaf devices and spine devices may be arranged in other configurations. Also, as shown in FIG. 1, the network devices 104(1)-104(4) are directly connected to corresponding leaf devices.

The designation of the network devices 102(*a*)(1)-102(*a*)(4) as leaf devices and of the network devices 102(*b*)(1)-102(*b*)(4) as spine devices indicates the device configuration within the network 100. The classification of these network devices as a leaf device or a spine device, however, may not necessarily indicate a device "type." All of the leaf devices and spine devices may be the same network device type. For example, the leaf devices and spine devices in the network 100 may all be switch devices (e.g., Open Systems Interconnection (OSI) model layer 2 or layer 3 switch devices, which may be referred to as "layer 2 switch devices" or "layer 3 switch devices"). Furthermore, in addition to being classified as a leaf device or a spine device, one of the network devices 102(*a*)(1)-102(*a*)(4) and 102(*b*)(1)-102(*b*)(4) may also be designated as a controller network device that is configured to provide identifiers to other network devices, as described by the techniques hereinafter. For example, in FIG. 1, network device 102(*a*)(1) is a switch device that is arranged as both a leaf device and as a controller device. In another example, the controller device may be a separate device (not shown in FIG. 1) that is independent from the leaf devices and switch devices.

Figure 1:
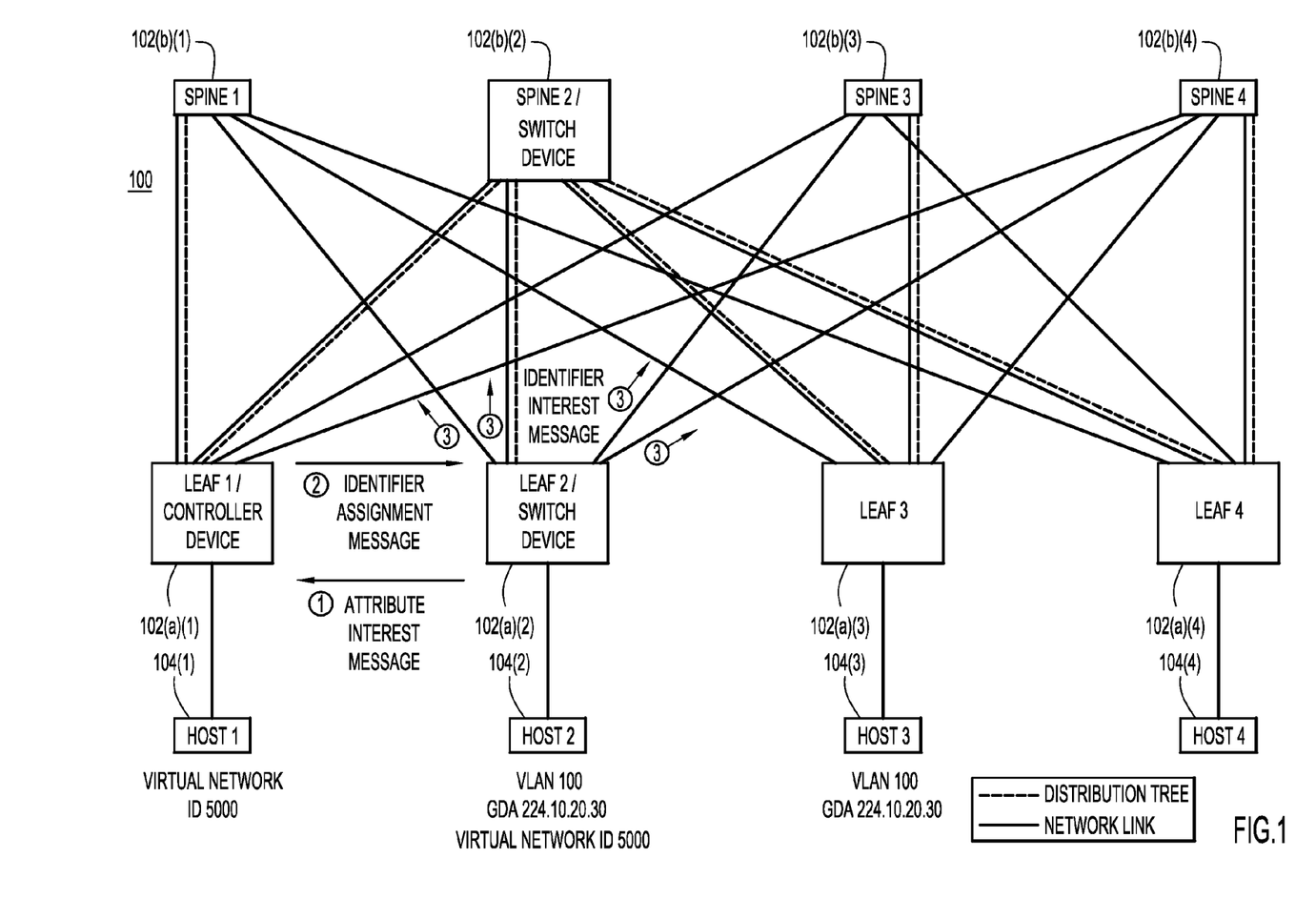
FIG. 1 shows an example system or network topology including switch devices that are configured to request from a controller device identifiers associated with network attributes to be used to modify the distribution of network communications in the network.

Thus, in FIG. 1, the network devices $102(a)(1)$-$102(a)(4)$ are switch devices that are configured as leaf devices, and the network devices $102(b)(1)$-$102(b)(4)$ are switch devices that are configured as spine devices. For simplicity, network device $102(a)(1)$ may be referred to as "leaf 1," network device $102(a)(2)$ may be referred to as "leaf 2," and so on. Leaf 1 may also be referred to as the "controller device." Similarly, network device $102(b)(1)$ may be referred to as "spine 1," network device $102(b)(2)$ may be referred to as "spine 2," and so on.

As stated above, the network devices 104(1)-104(4) are in direct communication with corresponding leaf devices. For example, network device 104(1) is in direct communication with leaf 1, network device 104(2) is in direct communication with leaf 2, and so on. The network devices 104(1)-104(4) may be computer devices and/or server devices that are configured to send and receive network communications (e.g., packets or frames) in the network 100. For example, the network devices 104(1)-104(4) may be computers, laptops, mobile devices, tablet computing devices, etc. configured as part of the network 100. For simplicity, the network devices 104(1)-104(4) are referred to hereinafter as host devices (e.g., network device 104(1) is referred to as "host device 1" or "host 1," network device 104(2) is referred to as "host device 2" or "host 2," and so on).

The host devices 104(1)-104(4) are configured to communicate with each other by exchanging packets or frames (hereinafter "frames"). For example, in network 100, when a source device (e.g., host 1) communicates with a destination device (e.g., host 2), frames are exchanged between host 1 and host 2 via switch devices (i.e., the leaf devices and spine devices that reside in a network path between host 1 and host 2). As frames are distributed through the network 100, they may travel between the source device and the destination device via one or more network links, which are shown in FIG. 1 (solid lines). For example, a frame sent from host 1 that is destined for host 2 may traverse any of the network links that ultimately will deliver the frame from host 1 to host 2.

Often times, a subset of these network links is determined in order to optimize the frame transmission and prevent duplications. For example, if host 1 is sending a frame to host 2, it may be more efficient to send the frame along the following distribution path:

host 1→leaf 1→spine 2→leaf 2→host 2 rather than sending the frame along another distribution path, for example:

host 1→leaf 1→spine 4→leaf 3→spine 2→leaf 2→host 2

That is, certain distribution paths within the network 100 may have a shorter number of path links in order for the frame to be sent from a particular source device to a particular destination device. As such, an optimal path may be selected among the network links for distribution of all frames in the network 100. This optimal path may be calculated by one or more of the leaf devices or spine devices in the network by using, for example, an intermediate system to intermediate system (IS-IS) routing protocol to determine a shortest path first (SPF) route among the network links. An example of this optimal path is shown as a distribution tree (dotted lines) in FIG. 1. For this distribution tree, spine 2 serves as the "root node," and thus, the distribution tree is said to be "rooted" at spine 2. Frames may be sent to and from any network device in the network along the distribution tree. Additionally, as network conditions change, the distribution tree may also change. For example, if one or more network links or network devices are removed from the network, or if new links or devices are added, a new SPF calculation may be performed in order to determine a new distribution tree (e.g., with a new root node).

As stated above, the host devices 104(1)-104(4) are configured to exchange frames with each other via the distribution tree. The host devices 104(1)-104(4) themselves have certain network attributes, and the frames that are exchanged between the host devices 104(1)-104(4) may be exchanged based on one or more of these attributes. For example, host device 2 and host device 3 may belong to a same virtual local area network (VLAN), and thus, frames associated with this VLAN may be exchanged between these host devices. In another example, the host devices 104(1)-104(4) may be configured with an internet protocol (IP) address attribute, a virtual network identifier attribute, etc., and frames can be sent between host devices by using these attributes.

For example, if host device 2 and host device 3 are in the same VLAN, host device 2 may send a multi-destination frame intended for host device 3. This frame may be, for example, a Transparent Interconnect of Lots of Links (TRILL) frame as defined by the Internet Engineering Task Force (IETF). Host device 2 may include the VLAN information in the payload of this TRILL frame to indicate that the frame is intended for the devices (e.g., host device 3) that reside in the same VLAN as host device 2. Similarly, the host device 1 may send a TRILL frame destined for host device 2 by sending a TRILL frame with TRILL frame payload that indicates the virtual network identifier of host device 2.

As stated above, spine 2 is the root node of the distribution tree in FIG. 1. Thus, all frames that are distributed within the distribution tree will pass through spine 2 before being sent to the destination device. As the root node of the distribution tree, spine 2 is connected to every leaf device in the network 100 along distribution tree paths. Traditionally, when a frame is sent by host 1 and is destined for host 2, host 1 sends the frame to leaf 1, and leaf 1 sends the frame to spine 1 and spine 2 along the distribution tree paths. Upon receiving the frame, spine 2 then forwards the packet to all of the leaf devices in the network 100. Leaf 2 receives the frame, determines that the frame is destined for host 2 and sends the frame to host 2 (since it is directly connected to host 2). On the other hand, leaf 3 and leaf 4 also receive the frame, but since the frame is destined for host 2, leaf 3 and leaf 4 discard the frame since they are not directly connected to host 2. Thus, in this traditional configuration, spine 2 unnecessarily sends the frame along the distribution tree to leaf 3 and leaf 4. The techniques described hereinafter improve on the traditional configuration by enabling spine 2 to send the frame only to relevant leaf devices associated with the frame without having to evaluate the payload of the frame itself (to, e.g., identify a destination IP address). That is, by utilizing the techniques described hereinafter, spine 2 is able to "prune" the distribution tree when it receives the frame in order to ensure that the frame is sent to leaf 2 but not to leaf 3 and leaf 4. These techniques allow for pruning to be accomplished by assigning identifiers to leaf devices and including these identifiers in headers of frames sent to spine devices.

Figure 2:
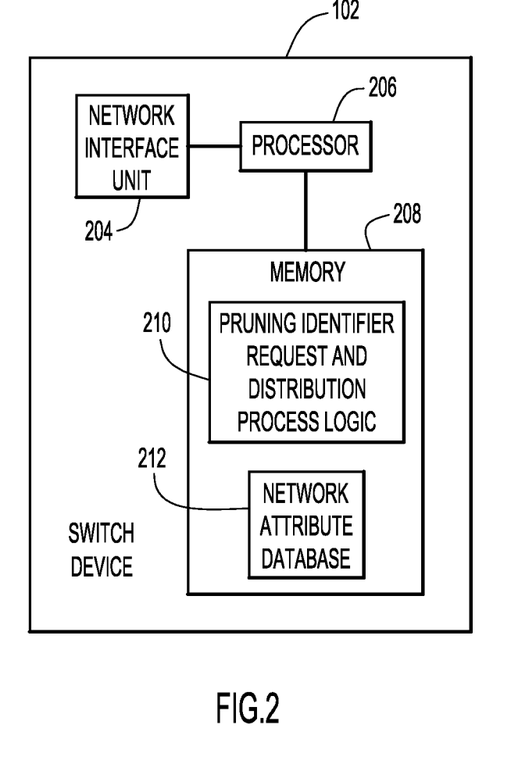
FIG. 2 shows an example block diagram of the switch device that is configured to request identifiers from the controller device and receive the identifiers that are mapped to network attributes from the controller device.

Reference is now made to FIG. 2. FIG. 2 shows an example block diagram of a switch device $102(a)$. It should be appreciated that the switch device 102 may be any of the leaf devices $102(a)(1)$-$102(a)(4)$. For simplicity, the switch device in FIG. 2 is referred to generally as "switch device 102." The switch device 102 comprises, among other components, a network interface unit 204, a processor 206 and a memory 208. The network interface unit 204 is configured to receive communications (e.g., frame) from devices in the network 100 and is configured to send communications to devices the network 100. For example, the network interface unit 204 is configured to send and receive frames from the host devices 104(1)-104(4) and other switch devices in the network 100. The network interface unit 204 is coupled to the processor 206. The processor 206 is, for example, a microprocessor or microcontroller that is configured to execute program logic instructions (i.e., software) for carrying out various operations and tasks of the switch device 102, as described herein. For example, the processor 206 is configured to execute pruning identifier request and distribution process logic 210 to request identifier information associated with network attributes and to update a network attribute database 212 with the identifier information. The functions of the processor 206 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 208 may comprise read only memory (ROM), random access memory (RAM), magnetic disk storage media devices, optical storage media devices, flash memory devices, electrical, optical, or other physical/tangible (non-transitory) memory storage devices. The memory 208 stores software instructions for the pruning identifier request and distribution process logic 210. The memory 208 also stores the network attribute database 212 that, as described above, stores context identifier information for virtual machines hosted by servers managed by the switch device 104. Thus, in general, the memory 208 may comprise one or more computer readable storage media (e.g., a memory storage device) encoded with software comprising computer executable instructions and when the software is executed (e.g., by the processor 206) it is operable to perform the operations described for the pruning identifier request and distribution process logic 210.

The pruning identifier request and distribution process logic 210 may take any of a variety of forms, so as to be encoded in one or more tangible computer readable memory media or storage device for execution, such as fixed logic or programmable logic (e.g., software/computer instructions executed by a processor), and the processor 206 may be an application specific integrated circuit (ASIC) that comprises fixed digital logic, or a combination thereof.

For example, the processor 206 may be embodied by digital logic gates in a fixed or programmable digital logic integrated circuit, which digital logic gates are configured to perform the pruning identifier request and distribution process logic 210. In general, the pruning identifier request and distribution process logic 210 may be embodied in one or more computer readable storage media encoded with software comprising computer executable instructions and when the software is executed operable to perform the operations described hereinafter.

Figure 3:
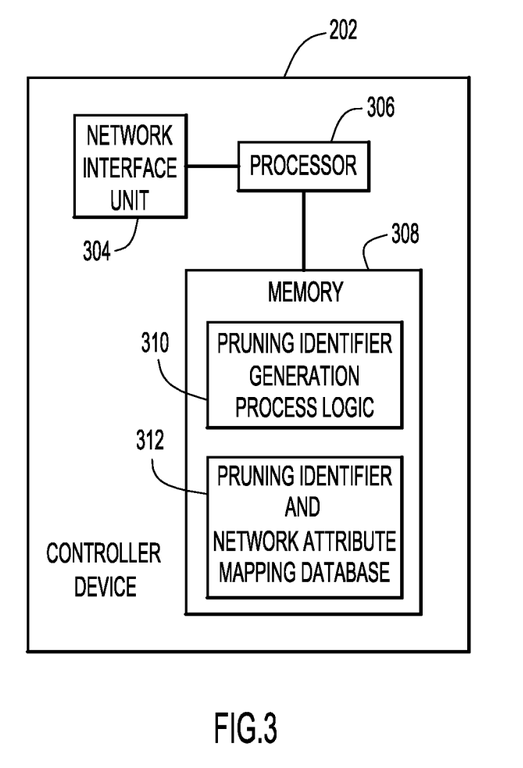
FIG. 3 shows an example block diagram of the controller device that is configured to receive the request for identifiers from the switch device and to send the identifiers that are mapped to the network attributes to the switch device.

Reference is now made to FIG. 3. FIG. 3 shows a block diagram of a controller device 202. As stated above, it should be appreciated that the controller device 202 may be any of the leaf devices 102(a)(1)-102(a)(4). Additionally, the controller device 202 may be a separate network device. For simplicity, the network 100 in FIG. 1 shows the controller device as leaf 1. The controller device 202 comprises, among other components, a network interface unit 304, a processor 306 and a memory 308. The network interface unit 304 is configured in a similar manner as the network interface unit 204 described in FIG. 2. The network interface unit 304 is coupled to the processor 306, which is similar to the processor 206 described in FIG. 2. In one example, the processor 306 is configured to execute pruning identifier generation process logic 310, stored in memory 308, to generate identifier information associated with network attributes of network devices and to update a pruning identifier and network attribute mapping database 312 with the identifier information. The memory 308 is similar to the memory 208 described in FIG. 2, above.

In general, as stated above in connection with FIG. 1, the root node of the distribution tree (e.g., spine 2) is configured to receive frames from leaf devices and to send frames to the leaf devices along links in the distribution tree. For example, spine 2 may receive from leaf 1 a frame originating from host 1 and destined for host 2. Upon receiving this frame, spine 2 sends the frame to leaf 2, leaf 3 and leaf 4 along links in the distribution tree. Leaf 2 forwards the frame to host 2 since host 2 is directly connected to leaf 2, but leaf 3 and leaf 4 discard the frame upon receipt since they are not directly connected to host 2. Thus, it is desirable for spine 2 to prune the distribution tree when it receives the frame such that the frame is not unnecessarily sent to leaf 3 and leaf 4. Since other spine devices in the network 100 may later serve as root nodes for other distribution trees in the network 100, it is also desirable for these spine devices to obtain the appropriate information to accomplish these pruning operations, if necessary. For simplicity, the techniques described hereinafter involve pruning the distribution tree that is rooted at spine 2.

Typically, spine 2 understands or "knows" its connectivity to the leaf devices, but spine 2 does not know which leaf devices are directly connected to corresponding host devices. Thus, upon receiving a frame, spine 2 distributes the frame along links in the distribution tree to all of the leaf devices to ensure that the frame reaches the intended destination. In order for spine 2 to send the frame only to appropriate leaf devices (and thus pruning the distribution tree), spine 2 must "know" or be made aware of which host devices are associated with corresponding leaf devices. Existing TRILL pruning techniques require modifications to hardware components of the spine devices to allow the spine devices to evaluate the payload of the frames to appropriately prune the distribution tree. These approaches, however, are not ideal, since the hardware components of the spine devices must be provisioned to know or understand all possible network attributes that are associated with the host devices. In other words, if a new network attribute (e.g., an IP version 6 (IPv6) address) is assigned to one or more of the host devices 104(1)-104(4), the hardware of the spine devices will have to be further modified so that the spine devices can evaluate frame payloads for these particular attributes. Since existing network protocols and attributes may change and evolve, these existing pruning techniques may be ineffective for widespread deployment within network topologies.

The techniques described hereinafter, however, offer solutions that allow distribution trees to be pruned independently of the evolving or newly added network attributes. In other words, the techniques described hereinafter are agnostic to additions or modification to network attributes assigned to the host devices 104(1)-104(4). These techniques provide a generic pruning approach without requiring modifications to hardware components of the spine devices. For example, this generic pruning approach allows the spine devices to prune distribution trees based on network attributes associated with the host devices and leaf devices without having to evaluate payloads of frames received from these devices.

In one example, according to the techniques described hereinafter, the leaf devices determine a set of one or more network attributes associated with network communications that the leaf devices are interested in receiving from other devices in the network. In other words, the leaf devices determine the network attributes associated with the corresponding host devices that are directly connected to the leaf devices and send this information to the controller device 202 in the network. For example, host devices that are connected to leaf 2 and leaf 3 (e.g., host 2 and host 3) may be arranged in a VLAN (e.g., VLAN 100), and as a result, leaf 2 and leaf 3 are "interested in" network communications involving VLAN 100 and may send this interest to the controller device 202. Similarly, host device 2, in addition to being provisioned in VLAN 100, may also be assigned a particular IP address or virtual network identifier. Thus, leaf 2 may also be interested in network communications associated with the particular IP address or virtual network identifier and may send this interest to the controller device 202. The leaf devices may send their attributes of interest to the controller device 202 by using, for example, an attribute interest message, as shown at reference numeral 1 in FIG. 1.

After receiving the network attributes of interest from the leaf devices, the controller device 202 generates identifiers for the network attributes and maps these identifiers to the network attributes of interest for each of the leaf devices. For example, if leaf 2 and leaf 3 are interested in VLAN 100, the controller device 202 generates an identifier (e.g., an identifier "1") associated with VLAN 100 and maps the identifier to VLAN 100. It should be appreciated that multiple attributes may be mapped to one network identifier. For example, an identifier may be mapped to the greatest common number of network attributes that are unique to a set of leaf devices. In other words, the identifier that is generated by the controller device 202 may be mapped to one network attribute that leaf devices are interested in or may be mapped to multiple network attributes, as the case may be. For example, multiple attributes may be mapped to one network identifier (e.g., a pruning identifier) if these attributes are interested by the same set of leaf devices.

Figure 4:
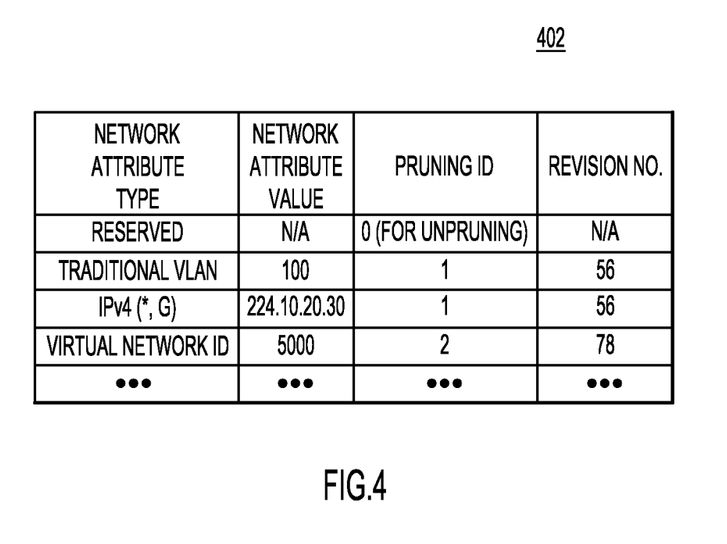
FIG. 4 is an example of mapping information that is generated by the controller device that maps the identifiers to corresponding network attributes associated with the identifiers.

Reference is now made to FIG. 4. FIG. 4 shows an example of mapping information table 402 (also referred to hereinafter as a "table" or "map") between the identifiers and the network attributes of interest. The identifiers generated by the controller device 202 may be referred to hereinafter as pruning identifiers or "pruning IDs," since these identifiers are ultimately utilized by the spine devices (and specifically spine 2 in FIG. 1) to prune the distribution tree network 100. As shown in FIG. 4, pruning ID "1" may be mapped to two different network attributes: a VLAN attribute with a "value" of 100 (e.g., VLAN 100) and an IP version 4 (IPv4) address attribute with a "value" of, for example, 224.10.20.30. Also as shown in FIG. 4, pruning ID "2" may be mapped to a single network attribute of a virtual network identifier with a "value" of 5000 (e.g., virtual network identifier 5000). Other identifiers and network attributes may be present in the table 402. The mapping information table 402 also has a reserved pruning ID "0." This reserved pruning ID is used to, in essence, "unprune" the distribution tree. In other words, if a leaf does not want a frame to be pruned, it can encode the reserved pruning ID "0" in the frame's header to inform the spine devices to skip pruning, as described by the techniques hereinafter. The controller device 202 may also be referred to as a pruning ID manager or PIDM.

After the controller device 202 generates the table 402, the table 402 is stored in the pruning identifier and network attribute mapping database 312 of the controller device 202. The table 402 is then sent to the leaf device(s) that requested the pruning identifier. For example, the table 402 is sent to the leaf device(s) by using an identifier assignment message, shown at reference numeral 2 in FIG. 1. Upon receiving the table 402, the leaf devices store the table 402 in the network attribute database 212 associated with each leaf device. The leaf devices can later access their network attribute database 212 to retrieve the table 402 and to append appropriate identifiers in headers of frames that are received from corresponding host devices. These techniques are described hereinafter.

The leaf devices are configured to send interested identifiers to the spine devices. As a result, every spine device receives the information regarding which leaf is interested in what identifiers. The leaf devices may send the identifiers to the spine devices via an identifier interest message, shown at reference numeral 3 in FIG. 1. Upon receiving the identifiers, the spine devices store the information in corresponding databases of the spine devices.

It should be appreciated that the leaf devices may send the attribute interest message to the controller device 202 by using a generic TRILL pruning protocol or GTPP. Likewise, the controller device 202 may send the identifier assignment message using the GTPP, and upon receiving the table 402, the leaf devices may distribute its interested identifiers to the spine devices via the identifier interest message that uses a new TRILL IS-IS Interested Pruning IDs TLV.

Additionally, it should be appreciated that as network conditions change, the leaf devices may become interested in different network attributes. For example, a new host device may join the network or attributes of existing host devices may change such that corresponding leaf devices are interested in new or different network attributes. Thus, leaf devices may need to update the pruning IDs assigned to these attributes in order to account for these changes. In order to update these pruning IDs, the leaf devices may send additional attribute interest messages to the controller device 202 in order to receive an updated table 402 with updated pruning ID-to-attribute mapping information. The leaf devices can utilize two approaches to obtain this information and distribute this updated information to the spine device: a sequential approach, where the leaf devices wait to receive a new identifier assignment message from the controller device 202 before sending updated identifier interest messages to the spine devices (informing the spine devices of the updates) or a parallel approach, where the leaf devices send the identifier interest messages to the spine devices while concurrently receiving new identifier assignment messages from the controller device 202. In other words, when the updated identifier interest messages are sent using the parallel approach, the leaf devices send pruning ID information based on "old" mapping information instead of waiting for a "new" mapping carried in identifier assignment messages. The mapping information is still updated, as the leaf devices may request an interest in a new pruning ID which it did not previously request. In one example, the parallel approach has faster convergence but may lead to excessive flooding when a leaf device becomes interested in a network attribute whose pruning ID is shared with other pruning attributes not interested by the leaf device. On the other hand, the sequential approach has slower convergence as it has to wait for new pruning ID allocation, but it may avoid excessive flooding.

There may be a transient period of time during the pruning ID allocation where the leaf devices are assigned inconsistent pruning IDs. For example, the controller device 202 may assign a first pruning ID to a network attribute, and while the first pruning ID is being sent to leaf 2, the controller device 202 may reallocate the first pruning ID to a new network attribute. Thus, to detect these potential inconsistencies, the table 402 also comprises a revision number associated with each of the pruning IDs. This revision number is updated whenever a pruning ID allocation has changed. For example, in FIG. 4, the revision number for pruning ID "1" is 56, indicating that the current mapping between pruning ID "1" and the network attributes is the 56$^{th}$ version of the allocation. Likewise, the revision number for pruning ID "2" is 78, indicating that the current mapping between pruning ID "2" and the network attributes is the 78$^{th}$ version of the allocation. The revision number associated with the pruning IDs can be used to determine whether the identifiers have been reassigned by the controller device 202 (i.e., if the pruning ID assignment is the "most recent" pruning ID assignment).

Figure 5:
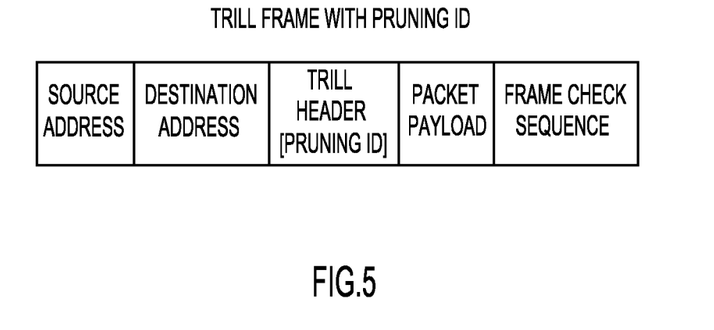
FIG. 5 is an example of a frame sent in the network with an identifier header comprising identifier information appended to the frame.

Reference is now made to FIG. 5. FIG. 5 shows an example of a subsequent frame 502 that is sent in the network 100 after the pruning IDs have been generated by the controller device 202 and distributed to the leaf devices and the spine devices. After the pruning IDs have been generated and distributed, the spine devices can evaluate subsequent frames to determine whether or not to prune the distribution tree. For example, when leaf 2 receives a frame from host 2, leaf 2 can add a pruning ID to the frame that corresponds to the network attribute associated with the frame. For example, if the frame is destined for a device configured in VLAN 100 (e.g., host 3), the frame can append the pruning ID that was assigned to VLAN 100 (e.g., pruning ID "1") in a header of the frame. Thus, after the pruning ID is added to the frame, the frame is sent to spine 2, and spine 2 can evaluate the header to determine the pruning ID associated with the frame. Since spine 2 is aware of all of the pruning IDs that all of the leaf devices are interested in, spine 2 can send the frame to only the leaf devices that are interested in the particular pruning ID. For example, spine 2 evaluates the header of the frame received from leaf 2 to determine that the frame is associated with pruning ID "1." If, for example, only leaf 3 is interested in pruning ID "1," spine 2 will send the frame to leaf 3 but not to leaf 1 or leaf 4, since they have not indicated (or "advertised") their interest for pruning ID "1." Thus, spine 2 can evaluate headers of frames to determine pruning IDs associated with the frames and can utilize these pruning IDs to prune the distribution tree without having to evaluate the payload of the frame and without having to be provisioned to identify particular network attributes. In one example, the frame may be a TRILL frame and the header with the pruning ID may be a TRILL header.

As stated above, a pruning ID may also be used to "unprune" the distribution tree. For example, if an inconsistency is detected in the assignment of pruning IDs to leaf devices, a leaf device may allow the spine devices to transiently unprune the frames associated with the inconsistent pruning IDs. This is achieved by the leaf devices encapsulating frames with a reserved pruning ID (e.g., pruning ID "0"), which may have a special semantic that instructs the spine devices not to prune frames that are encapsulated with the reserved pruning ID.

Figure 6:
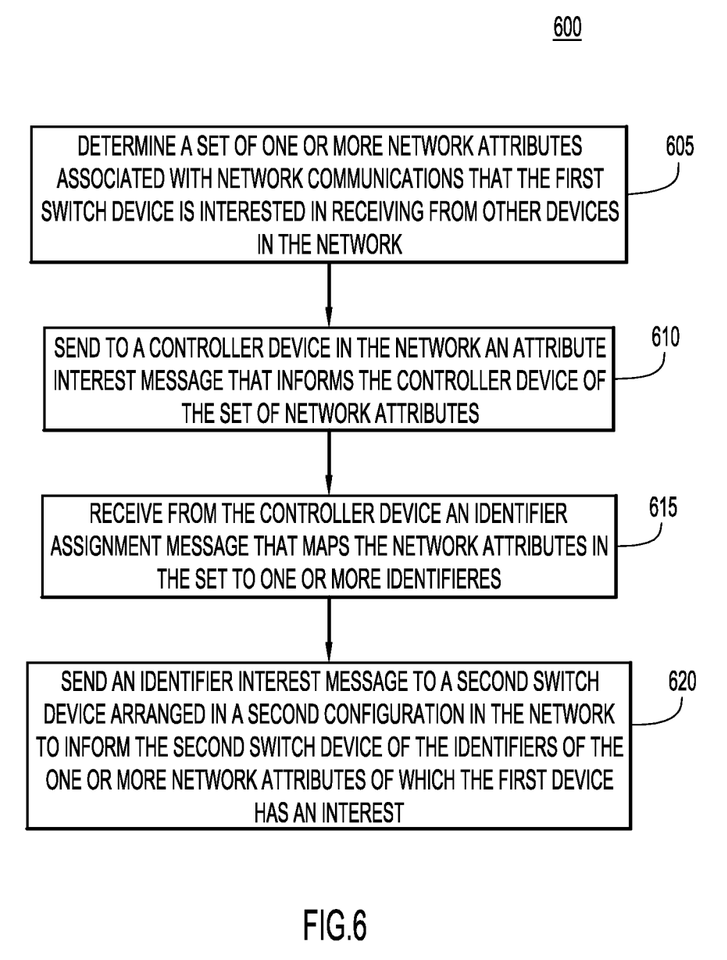
FIG. 6 is an example flow chart depicting operations for the switch device requesting the identifiers and receiving the identifiers from the controller device.

Reference is now made to FIG. 6. FIG. 6 is an example flow chart 600 depicting operations of the pruning identifier request and distribution process logic 210 performed by one of the leaf devices to request the pruning IDs from the controller device 202. At operation 605, a first switch device (e.g., a leaf device) determines a set of one or more network attributes associated with network communications that the first switch device is interested in receiving from other devices in the network. At operation 610, the first switch device sends to a controller device (e.g., controller device 202/leaf 1) in the network an attribute interest message that informs the controller device of the set of network attributes. The first switch device then receives from the controller device, at operation 615, an identifier assignment message that maps the network attributes in the set to one or more identifiers. These identifiers are configured to be included in a header of a subsequent frame sent in the network. At operation 620, the first switch device sends an identifier interest message to a second switch device (e.g., a spine device) arranged in a second configuration in the network to inform the second switch device of the identifiers of the one or more network attributes of which the first device has an interest.

Figure 7:
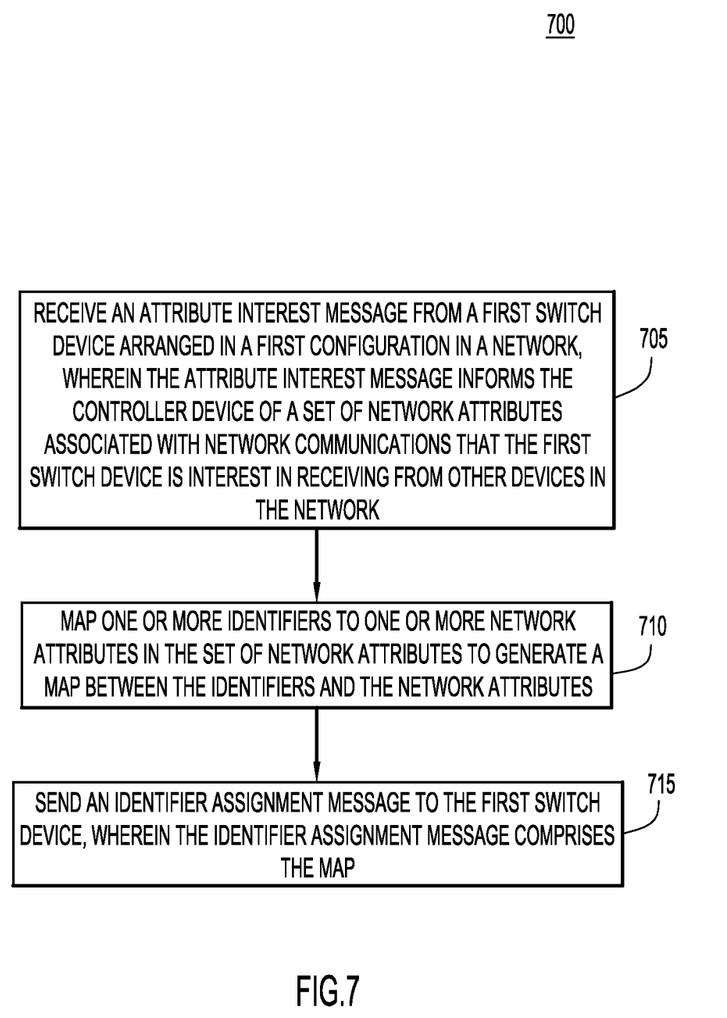
FIG. 7 is an example flow chart depicting operations for the controller device receiving the request for the identifiers and sending the identifiers to the leaf switch device.

Reference is now made to FIG. 7. FIG. 7 shows an example flow chart 700 depicting operations performed by the pruning identifier generation process logic 310 for generating identifiers and mapping the identifiers to network attributes. At operation 705, a controller device (e.g., controller device 202/leaf 1) in a network receives an attribute interest message from a first switch device (e.g., a leaf device) arranged in a first configuration in a network (e.g., a leaf configuration). The attribute interest message informs the controller device of a set of network attributes associated with network communications that the first switch device is interested in receiving from other devices in the network. At operation 710, the controller device maps one or more identifiers to one or more network attributes in the set of network attributes to generate a map between the identifiers and the network attributes. The identifiers are configured to be included in a header of a subsequent frame sent in the network. At operation 715, the controller device sends an identifier assignment message to the first switch device. The identifier assignment message comprises the map.

It should be appreciated that the techniques described above in connection with all embodiments may be performed by one or more computer readable storage media that is encoded with software comprising computer executable instructions to perform the methods and steps described herein. For example, the operations performed by the leaf device, spine devices and controller device may be performed by one or more computer or machine readable storage media (non-transitory) or device executed by a processor and comprising software, hardware or a combination of software and hardware to perform the techniques described herein.

In summary, a method is provided comprising: at a first switch device arranged in a first configuration in a network, determining a set of one or more network attributes associated with network communications that the first switch device is interested in receiving from other devices in the network; sending to a controller device in the network an attribute interest message that informs the controller device of the set of network attributes; receiving from the controller device an identifier assignment message that maps the network attributes in the set of one or more network attributes to one or more identifiers, wherein the one or more identifiers are configured to be included in a header of a subsequent frame sent in the network; and sending an identifier interest message to a second switch device arranged in a second configuration in the network, wherein the identifier interest message is sent to inform the second switch device of the identifiers of the one or more network attributes of which the first device has an interest.

Additionally, a method is provided comprising: at a controller device in a network, receiving an attribute interest message from a first switch device arranged in a first configuration in a network, wherein the attribute interest message informs the controller device of a set of network attributes associated with network communications that the first switch device is interest in receiving from other devices in the network; mapping one or more identifiers to one or more network attributes in the set of network attributes to generate a map between the identifiers and the network attributes, wherein the one or more identifiers are configured to be included in a header of a subsequent frame sent in the network; and sending an identifier assignment message to the first switch device, wherein the identifier assignment message comprises the map.

Furthermore, an apparatus is provided comprising: a network interface unit; a memory; and a processor coupled to the network interface unit and the memory and configured to: determining a set of one or more network attributes associated with network communications that the apparatus is interested in receiving from other devices in the network; send to a controller device in the network an attribute interest message that informs the controller device of the set of network attributes; receive from the controller device an identifier assignment message that maps the network attributes in the set of one or more network attributes to one or more identifiers, wherein the one or more identifiers are configured to be included in a header of a subsequent frame sent in the network; and send an identifier interest message to a switch device in the network, wherein the identifier interest message is sent to inform the switch device of the identifiers of the one or more network attributes of which the apparatus has an interest.

In addition, an apparatus is provided comprising: a network interface unit; a memory; and a processor coupled to the network interface unit and the memory and configured to: receive an attribute interest message from a first switch device arranged in a first configuration in a network, wherein the attribute interest message informs the apparatus of a set of network attributes associated with network communications that the first switch device is interested in receiving from other devices in the network; map one or more identifiers to one or more network attributes in the set of network attributes to generate a map between the identifiers and the network attributes, wherein the one or more identifiers are configured to be included in a header of a subsequent frame sent in the network; and send an identifier assignment message to the first switch device, wherein the identifier assignment message comprises the map.

The above description is intended by way of example only. Various modifications and structural changes may be made therein without departing from the scope of the concepts described herein and within the scope and range of equivalents of the claims.

What is claimed is:

1. A method comprising:
at a first switch device arranged in a first configuration in a network, determining a set of one or more network attributes associated with network communications that the first switch device is interested in receiving from other devices in the network;
sending to a controller device in the network an attribute interest message that informs the controller device of the set of network attributes;
receiving from the controller device an identifier assignment message that maps the network attributes in the set of one or more network attributes to one or more identifiers, wherein the one or more identifiers are configured to be included in a header of a subsequent frame sent in the network; and
sending an identifier interest message to a second switch device arranged in a second configuration in the network, wherein the identifier interest message is sent to inform the second switch device of the identifiers of the one or more network attributes of which the first device has an interest.

2. The method of claim 1, wherein receiving comprises receiving the identifier assignment message from the controller device that is configured as a third switch device arranged in the first configuration in the network.

3. The method of claim 1, wherein sending the identifier interest message comprises sending the identifier interest message such that the second switch device utilizes the identifier information to evaluate the header of a Transparent Interconnect of Lots of Links (TRILL) frame to determine whether to forward the TRILL frame to the first switch device without evaluating a payload of the TRILL frame.

4. The method of claim 1, wherein receiving the identifier assignment message comprises receiving the identifier assignment message with one of the identifiers mapped to more than one of the network attributes.

5. The method of claim 1, further comprising sending a new identifier interest message to the second switch device comprising updated information of the identifiers that the first switch device is interested in using a sequential approach, wherein the first switch device waits to receive a new identifier assignment message from the controller device before sending the new identifier interest message to the second switch device.

6. The method of claim 1, wherein sending the identifier interest message comprises sending the identifier interest message to the second switch device using a parallel approach, wherein the first switch device sends the identifier interest message to the second switch device while concurrently receiving a new identifier assignment message from the controller device.

7. The method of claim 1, wherein receiving the identifier assignment message comprises receiving the identifier assignment message from the controller device that is configured as a pruning identifier management device.

8. The method of claim 1, further comprising evaluating the identifier assignment message to determine a revision number associated with the identifiers to determine whether the identifiers have been reassigned by the controller device before the first switch device receives the identifier assignment message.

9. The method of claim 1, further comprising sending frames with a reserved pruning identifier that the second switch device utilizes to send the frames to all switch devices in the network along the distribution tree.

10. A method comprising:
at a controller device in a network, receiving an attribute interest message from a first switch device arranged in a first configuration in a network, wherein the attribute interest message informs the controller device of a set of network attributes associated with network communications that the first switch device is interested in receiving from other devices in the network;
mapping one or more identifiers to one or more network attributes in the set of network attributes to generate a map between the identifiers and the network attributes for determining, by a second switch device based on the map, whether to forward a Transparent Interconnect of Lots of Links (TRILL) frame without evaluating a payload of the TRILL frame, wherein the one or more identifiers are configured to be included in a header of a subsequent frame sent in the network; and
sending an identifier assignment message to the first switch device, wherein the identifier assignment message comprises the map.

11. The method of claim 10, wherein the controller device is configured as a third switch device arranged in the first configuration in the network.

12. The method of claim 10, wherein sending the identifier assignment message comprises sending the identifier assignment message such that the first switch device announces its interests in identifiers to the second switch device in the network such that the second switch device utilizes the identifier information to evaluate the header of the TRILL frame.

13. The method of claim 12, wherein sending the identifier assignment message comprises sending the identifier assignment message such that the second switch device prunes the distribution of the TRILL frame in the network by sending the TRILL frame in the network to some but not all of the network devices in the network based on the identifier information in the header of the TRILL frame.

14. The method of claim 13, further comprising sending the identifier assignment message such that the second switch device prunes a distribution tree within the network.

15. The method of claim 10, wherein receiving the attribute interest message comprises receiving the attribute interest message from the first switch device using a generic Transparent Interconnect of Lots of Links (TRILL) pruning protocol (GTPP) and wherein sending the identifier assignment message comprises sending the identifier assignment message to the first switch device using the GTPP.

16. The method of claim 10, further comprising updating a revision number associated with the identifiers when the identifiers are mapped to the network attributes.

17. An apparatus comprising:
a network interface unit;
a memory; and
a processor coupled to the network interface unit and the memory and configured to:
determining a set of one or more network attributes associated with network communications that the apparatus is interested in receiving from other devices in the network;
send to a controller device in the network an attribute interest message that informs the controller device of the set of network attributes;
receive from the controller device an identifier assignment message that maps the network attributes in the set of one or more network attributes to one or more identifiers, wherein the one or more identifiers are configured to be included in a header of a subsequent frame sent in the network; and
send an identifier interest message to a switch device in the network, wherein the identifier interest message is sent to inform the switch device of the identifiers of the one or more network attributes of which the apparatus has an interest.

18. The apparatus of claim 17, wherein the processor is further configured to send the identifier interest message such that the switch device utilizes the identifier information to evaluate the header of a Transparent Interconnect of Lots of Links (TRILL) frame to determine whether to forward the TRILL frame to the first switch device without evaluating a payload of the TRILL frame.

19. The apparatus of claim 17, wherein the processor is further configured to receive the identifier assignment message with one of the identifiers mapped to more than one of the network attributes.

20. The apparatus of claim 17, wherein the processor is further configured to send a new identifier interest message to the switch device comprising updated information of the identifiers that the apparatus is interested in using a sequential approach, wherein the processor waits to receive a new identifier assignment message from the controller device before sending the new identifier interest message to the switch device.

21. The apparatus of claim 17, wherein the processor is further configured to send the identifier interest message to the switch device using a parallel approach, wherein the processor sends the identifier interest message to the switch device while concurrently receiving a new identifier assignment message from the controller device.

22. The apparatus of claim 17, wherein the processor is further configured to receive the identifier assignment message from the controller device that is configured as a pruning identifier management device.

23. The apparatus of claim 17, wherein the processor is further configured to evaluate the identifier assignment message to determine a revision number associated with the identifiers to determine whether the identifiers have been reassigned by the controller device before the apparatus receives the identifier assignment message.

24. The apparatus of claim 17, wherein the processor is further configured to send frames with a reserved pruning identifier that the switch device utilizes to send the frames to all switch devices in the network along the distribution tree.

25. An apparatus comprising:
a network interface unit;
a memory; and
a processor coupled to the network interface unit and the memory and configured to:
receive an attribute interest message from a first switch device arranged in a first configuration in a network, wherein the attribute interest message informs the apparatus of a set of network attributes associated with network communications that the first switch device is interested in receiving from other devices in the network;
map one or more identifiers to one or more network attributes in the set of network attributes to generate a map between the identifiers and the network attributes for determining, by a second switch device based on the map, whether to forward a Transparent Interconnect of Lots of Links (TRILL) frame without evaluating a payload of the TRILL frame, wherein the one or more identifiers are configured to be included in a header of a subsequent frame sent in the network; and
send an identifier assignment message to the first switch device, wherein the identifier assignment message comprises the map.

26. The apparatus of claim 25, wherein the processor is further configured to send the identifier assignment message such that the first switch device announces its interests in identifiers to the second switch device in the network such that the second switch device utilizes the identifier information to evaluate the header of the TRILL frame.

27. The apparatus of claim 26, wherein the processor is further configured to send the identifier assignment message such that the second switch device prunes the distribution of the TRILL frame in the network by sending the TRILL frame in the network to some but not all of the network devices in the network based on the identifier information in the header of the TRILL frame.

* * * * *